US010792655B2

(12) United States Patent
Virtanen et al.

(10) Patent No.: US 10,792,655 B2
(45) Date of Patent: Oct. 6, 2020

(54) DISPENSER DEVICE AND A METHOD FOR RINSING THE DISPENSER DEVICE

(71) Applicant: WALLAC OY, Turku (FI)

(72) Inventors: Ville Virtanen, Rusko (FI); Timo Maki-Laurila, Turku (FI)

(73) Assignee: WALLAC OY, Turku (FI)

(*) Notice: Subject to any disclaimer, the term of this patent is extended or adjusted under 35 U.S.C. 154(b) by 375 days.

(21) Appl. No.: 15/534,034

(22) PCT Filed: Nov. 11, 2015

(86) PCT No.: PCT/FI2015/050786
§ 371 (c)(1),
(2) Date: Jun. 8, 2017

(87) PCT Pub. No.: WO2016/092148
PCT Pub. Date: Jun. 16, 2016

(65) Prior Publication Data
US 2017/0326541 A1 Nov. 16, 2017

(30) Foreign Application Priority Data
Dec. 10, 2014 (FI) .................................... 20146080

(51) Int. Cl.
G01N 35/10 (2006.01)
B01L 3/02 (2006.01)
(Continued)

(52) U.S. Cl.
CPC ............ B01L 3/0206 (2013.01); B01L 13/02 (2019.08); G01F 11/02 (2013.01);
(Continued)

(58) Field of Classification Search
None
See application file for complete search history.

(56) References Cited

U.S. PATENT DOCUMENTS 3,402,852 A    9/1968  Jones
3,577,279 A *  5/1971  Lightner ............... B01L 3/0217
                                                          134/23
(Continued)

FOREIGN PATENT DOCUMENTS

EP    3064948      9/2016
GB    2487863 A    8/2012
(Continued)

OTHER PUBLICATIONS

International Search Report, dated Feb. 23, 2016, from corresponding PCT/FI2015/050786 application.
(Continued)

Primary Examiner — Jill A Warden
Assistant Examiner — Brittany I Fisher
(74) Attorney, Agent, or Firm — Nixon & Vanderhye

(57) ABSTRACT

A dispenser device includes: a valve system, a dispensing head for dispensing liquid and connected with a transfer tube to the valve system, a dispensing pump connected to the valve system, a first inlet port for conducting rinse liquid to the valve system, and a second inlet port for conducting rinse gas to the valve system. The device includes control equipment for operating the valve system so that the flow via the transfer tube towards the dispensing head includes both the rinse liquid and the rinse gas. The rinse gas is capable of collecting gas bubbles formed on the inner walls of the transfer tube to larger amounts of gas. Thus, the rinse gas facilitates the removal of the gas bubbles with the aid of the rinse liquid.

26 Claims, 4 Drawing Sheets

(51) Int. Cl.
  *G01F 11/02* (2006.01)
  *B01L 3/00* (2006.01)
  *G01F 11/00* (2006.01)

(52) U.S. Cl.
  CPC ............ *G01N 35/1004* (2013.01); *B01L 3/00* (2013.01); *B01L 2200/0673* (2013.01); *B01L 2200/0684* (2013.01); *G01F 11/00* (2013.01); *G01F 11/021* (2013.01)

(56) References Cited

U.S. PATENT DOCUMENTS

| | | | | |
|---|---|---|---|---|
| 4,984,475 | A * | 1/1991 | Uffenheimer | G01N 35/1004 73/864.22 |
| 5,480,809 | A * | 1/1996 | Salin | H01J 49/045 239/338 |
| 5,506,142 | A | 4/1996 | Mahaffey et al. | |
| 5,613,713 | A * | 3/1997 | Gysi | B08B 9/0321 134/166 C |
| 5,730,938 | A * | 3/1998 | Carbonari | G01N 35/10 134/170 |
| 6,066,298 | A * | 5/2000 | Fukunaga | G01N 1/38 134/170 |
| 6,143,252 | A * | 11/2000 | Haxo, Jr. | B01J 19/0046 422/131 |
| 6,495,106 | B1 * | 12/2002 | Kalra | G01N 1/312 422/510 |
| 6,709,870 | B2 * | 3/2004 | Suzuki | G01N 1/14 422/63 |
| 7,621,282 | B2 * | 11/2009 | Blackwell | G01N 35/1004 134/22.1 |
| 2001/0004449 | A1 * | 6/2001 | Suzuki | G01N 1/14 422/63 |
| 2002/0028926 | A1 * | 3/2002 | Shoji | B01L 3/0275 536/25.4 |
| 2004/0151636 | A1 | 8/2004 | Hsu et al. | |
| 2005/0244299 | A1 * | 11/2005 | Dasgupta | G01N 35/08 422/68.1 |
| 2006/0258011 | A1 | 11/2006 | Shvets et al. | |
| 2009/0217951 | A1 | 9/2009 | Ngo et al. | |
| 2012/0000297 | A1 * | 1/2012 | Hashizume | A61B 5/02042 73/863.02 |

FOREIGN PATENT DOCUMENTS

| | | |
|---|---|---|
| IT | 1076837 B | 4/1985 |
| WO | 88/10158 A1 | 12/1988 |
| WO | 93/12432 A1 | 6/1993 |
| WO | 03/098218 A1 | 11/2003 |

OTHER PUBLICATIONS

FI Search Report, dated Jul. 9, 2015, from corresponding FI20146080 application.
European Office Action dated Oct. 19, 2018 in corresponding European Patent Application No. 15805555.8.
Office Action issued in Indian Patent Application No. 201727020205 dated Jan. 14, 2020 with English translation provided.
Office Action issued in Australian Patent Application No. 2015359241 dated May 11, 2020.

* cited by examiner

DISPENSER DEVICE AND A METHOD FOR RINSING THE DISPENSER DEVICE

FIELD OF THE DISCLOSURE

The disclosure of this document relates generally to dispensing liquids. More particularly, the disclosure relates to a dispenser device that can be, for example but not necessary, a pipette dispenser. Furthermore, the disclosure relates to a method for removing gas bubbles, e.g. air bubbles, from a dispenser device. Furthermore, the disclosure relates to a computer program for the purpose of removing gas bubbles from a dispenser device.

BACKGROUND

Devices for dispensing liquids with a good accuracy are needed in conjunction with many processes. For example, in a genetic screening processor "GSP" instrument, a dispenser device for dispensing reagent is typically a pipette dispenser. In this case, the pipette dispenser can be for example a positive-displacement type dispenser where distilled water or some other suitable liquid is used as system liquid. The pipette dispenser comprises a dispenser pump, a valve system connected to the dispenser pump, and a dispensing head connected with a transfer tube to the valve system. The dispenser pump can be e.g. a syringe pump. The transfer tube is advantageously flexible so that the dispensing head can be moved with respect to e.g. a sample well plate. The transfer tube can be made of e.g. polytetrafluoroethylene "PTFE" or some other suitable material. The valve system may comprise for example a ceramic valve. Furthermore, the pipette dispenser may comprise a pressure sensor for detecting the pressure prevailing in the transfer tube and the dispenser head. The system liquid can be taken from a liquid reservoir with the aid of the syringe pump so that the valve system is set to constitute a flow connection from the liquid reservoir to the syringe pump. During dispensing operation, the valve system is, in turn, set to constitute a flow connection from the syringe pump to the transfer tube connected to the dispenser head.

In many cases, a dispenser device of the kind described above is not provided with a degasser for preventing gas formation into the liquid channels of the dispenser device. Therefore, gas bubbles, e.g. air bubbles, may accumulate for example in the above-mentioned transfer tube. The gas bubbles may cause anomalies in the dispensing and worsen the accuracy of the dispensing. A known method for removing the gas bubbles is to rinse the transfer tube with a sufficient flow rate of rinse liquid that is advantageously the same as the system liquid of the dispenser device, e.g. distilled water. Especially in cases where the transfer tube is made of material such as the PTFE that has its advantages but is hydrophobic, a high flow rate of the rinse liquid is needed for removing the gas bubbles. This process for removing the gas bubbles can be time consuming and unpredictable, and thus it reduces the overall utilization rate of the dispenser device.

SUMMARY

The following presents a simplified summary in order to provide a basic understanding of some aspects of various exemplifying embodiments. The summary is not an extensive overview of the disclosure of this document. It is neither intended to identify key or critical elements of exemplifying embodiments nor to delineate the protection scope. The following summary merely presents some concepts in a simplified form as a prelude to a more detailed description of exemplifying embodiments.

In accordance with the disclosure, there is provided a new dispenser device that can be, for example but not necessary, a pipette dispenser. A dispenser device according to the invention comprises:
- a valve system,
- a dispensing head for dispensing liquid and connected with a transfer tube to the valve system,
- a dispensing pump connected to the valve system,
- a first inlet port for conducting rinse liquid to the valve system,
- a second inlet port for conducting rinse gas to the valve system, and
- control equipment for operating the valve system during a time period so that the flow in the transfer tube towards the dispensing head comprises both the rinse liquid and the rinse gas, and subsequently after the time period so that the valve system conducts only the rinse liquid to the transfer tube.

The rinse gas directed to the transfer tube is capable of collecting gas bubbles formed on the inner walls of the transfer tube to larger amounts of gas which can be more easily removed by the rinse liquid than the smaller gas bubbles. Thus, the rinse gas facilitates the removal of the gas bubbles with the aid of the rinse liquid. The rinse liquid is advantageously the same as system liquid of the dispenser device, e.g. distilled water. The rinse gas can be air or some other suitable gas capable of collecting gas bubbles to larger amounts of gas.

In accordance with the disclosure, there is provided also a new method for removing gas bubbles, e.g. air bubbles, from a dispenser device that comprises:
- a valve system,
- a dispensing head for dispensing liquid and connected with a transfer tube to the valve system,
- a dispensing pump connected to the valve system,
- a first inlet port for conducting rinse liquid to the valve system, and
- a second inlet port for conducting rinse gas to the valve system.

A method according to the invention comprises operating the valve system during a time period so that the flow in the transfer tube towards the dispensing head comprises both the rinse liquid received from the first inlet port and the rinse gas received from the second inlet port, and subsequently after the time period so that the valve system conducts only the rinse liquid to the transfer tube.

In accordance with the disclosure, there is provided also a new computer program for the purpose of removing gas bubbles from a dispenser device of the kind described above. The computer program comprises computer executable instructions for controlling a programmable processing system to operate the valve system of the dispenser device during a time period so that the flow in the transfer tube towards the dispensing head comprises both the rinse liquid received from the first inlet port and the rinse gas received from the second inlet port, and subsequently after the time period so that the valve system conducts only the rinse liquid to the transfer tube.

In accordance with the disclosure, there is provided also a new computer program product. The computer program product comprises a non-volatile computer readable medium, e.g. a compact disc "CD", encoded with a computer program according to the disclosure.

A number of exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

Exemplifying and non-limiting embodiments and their advantages are explained in greater detail below in the sense of examples and with reference to the accompanying drawings, in which.

DESCRIPTION OF EXEMPLIFYING AND NON-LIMITING EMBODIMENTS

Figure 1:
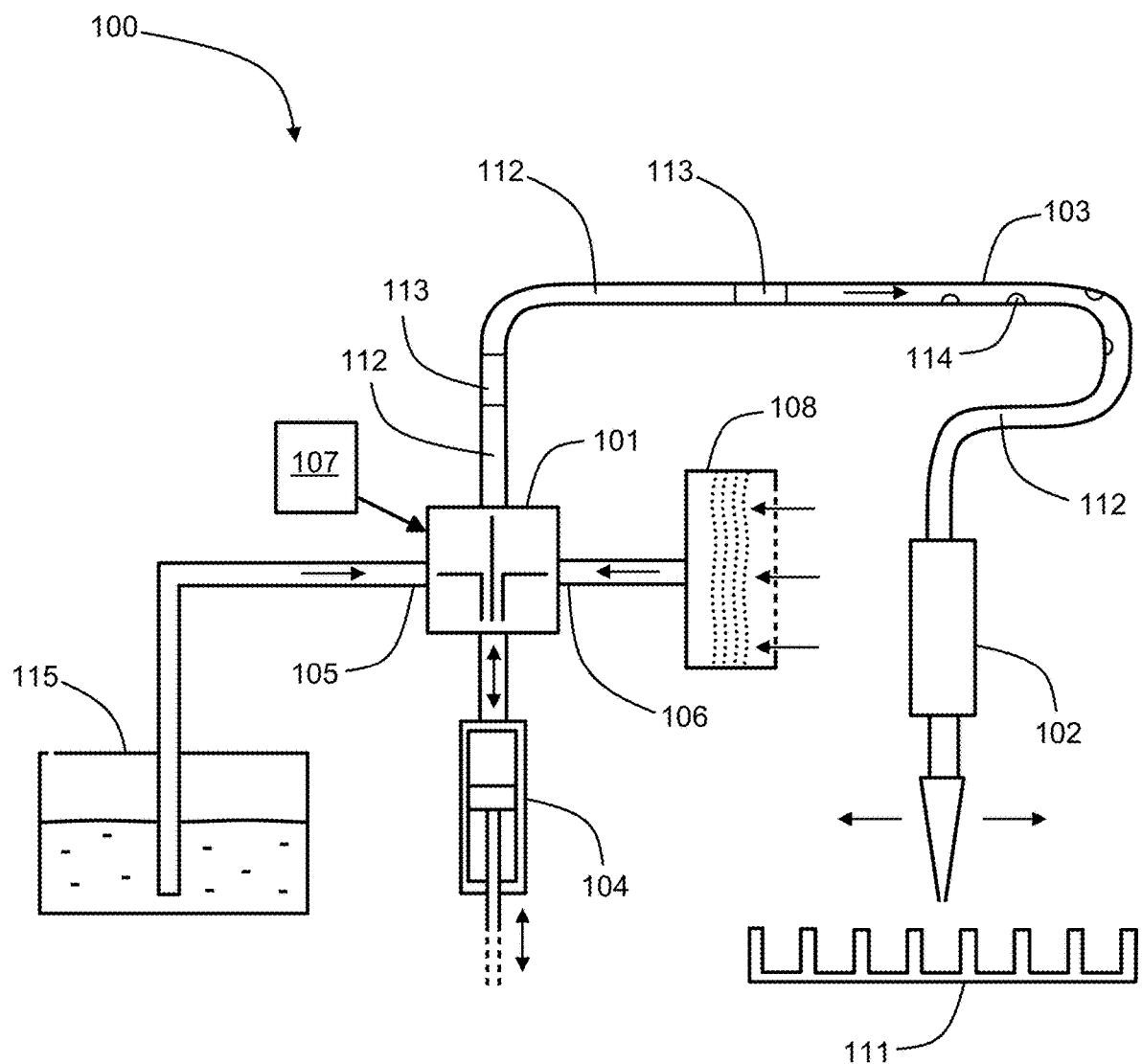
FIG. 1 illustrates a dispenser device according to an exemplifying and non-limiting embodiment.

FIG. 1 illustrates a dispenser device 100 according to an exemplifying and non-limiting embodiment. The dispenser device comprises a dispensing pump 104, a valve system 101, and a dispensing head 102 for dispensing liquid. The dispensing head 102 is connected to the valve system 101 with a transfer tube 103. Furthermore, the dispenser device 100 may comprise a pressure sensor for detecting the pressure prevailing in the transfer tube and the dispenser head. The pressure sensor is not shown in FIG. 1. The transfer tube 103 is advantageously flexible so that the dispensing head 102 can be moved with respect to e.g. a sample well plate 111. The transfer tube 103 can be made of e.g. polytetrafluoroethylene "PTFE" or some other suitable material. The valve system 101 may comprise for example one or more ceramic valves. The dispenser device comprises a first inlet port 105 for conducting rinse liquid to the valve system 101 and a second inlet port 106 for conducting rinse gas to the valve system 101. The dispenser device comprises control equipment 107 for operating the valve system so that the flow in the transfer tube 103 towards the dispensing head 102 comprises both the rinse liquid and the rinse gas. In FIG. 1, the rinse liquid which is in the transfer tube 103 is denoted with a reference number 112 and the rinse gas which is in the transfer tube is denoted with a reference number 113. As illustrated in by FIG. 1, the flow in the transfer tube contains columns of the rinse gas. These columns of the rinse gas are capable of collecting gas bubbles formed on the inner walls of the transfer tube to larger amounts of gas which can be more easily removed by the rinse liquid than the smaller gas bubbles. In FIG. 1, one of the gas bubbles is denoted with a reference number 114. The rinse liquid is advantageously the same as the system liquid of the dispenser device, e.g. distilled water. In the exemplifying case illustrated in the FIG. 1, the rinse liquid is stored in a reservoir 115 connected with a tube to the first inlet port 105.

In the exemplifying dispenser device illustrated in FIG. 1, the dispensing pump 104 is a syringe pump. The valve system 101 is configured to conduct the rinse liquid and/or gas from the dispensing pump 104 to the transfer tube 103 when the valve system is in a first position. The valve system 101 is configured to conduct the rinse liquid from the first inlet port 105 to the dispensing pump 104 when the valve system is in a second position, and the valve system 101 is configured to conduct the rinse gas from the second inlet port 106 to the dispensing pump when the valve system is in a third position. The control equipment 107 can be a mechanical lever with the aid of which it is possible to manually change the position of the valve system between the above-mentioned first, second, and third positions. It is also possible that the valve system 101 is an electrically controllable valve system in which case the control equipment 107 comprises an electronic controller. The electronic controller may comprise a memory and a processing system for operating the valve system 101 according to a predetermined operation-sequence and in synchronism with the operation of the dispensing pump 104.

In the exemplifying dispenser device illustrated in FIG. 1, the dispensing pump 104 is used for pumping the rinse liquid and the rinse gas to the transfer tube 103. The control equipment 107 is suitable for operating the valve system 101 so that the valve system conducts the rinse liquid from the first inlet port 105 to the dispensing pump 104 when the dispensing pump is in a suction phase and thereafter the valve system conducts the rinse liquid from the dispensing pump 104 to the transfer tube 103 when the dispensing pump is in an exhaustion phase. This operation-sequence for pumping the rinse liquid can be repeated for a desired number of times in order to pump a desired amount of the rinse liquid to the transfer tube 103. The control equipment 107 is suitable for operating the valve system 101 also so that the valve system conducts the rinse gas from the second inlet port 106 to the dispensing pump 104 when the dispensing pump is in a suction phase and thereafter the valve system conducts the rinse gas from the dispensing pump 104 to the transfer tube 103 when the dispensing pump is in an exhaustion phase. This operation-sequence for pumping the rinse gas can be repeated for a desired number of times in order to pump a desired amount of the rinse gas to the transfer tube 103. The rinsing operation is advantageously started by pumping the rinse liquid to the transfer tube 103 so that the above-described operation-sequence for pumping the rinse liquid is carried out a desired number of times. Thereafter, the above-described operation-sequence for pumping the rinse gas is carried out a desired number of times in order to form a gas column into the transfer tube 103. Thereafter, the operation-sequence for pumping the rinse liquid is carried out a desired number of times in order to move the gas column in the transfer tube. The above-described operation can be repeated for a desired number of times so as to transfer a desired number of gas columns through the transfer tube 103. In the exemplifying situation presented in FIG. 1, the rinse gas 113 forms two gas columns in the transfer tube 103.

In the above-presented exemplifying case, the valve system 101 is operated so that the rinse liquid and the rinse gas are alternately conducted to the transfer tube 103. In principle it is also possible to use a mixer valve which conducts a mixture of the rinse liquid and the rinse gas to the transfer tube. In this case, the rinse liquid forms in the transfer tube liquid columns due to the cohesion force acting in the rinse liquid.

The exemplifying dispenser device illustrated in FIG. 1 is configured to use the ambient air as the above-mentioned rinse gas. The dispenser device 100 comprises advantageously a filter 108 for purifying the air used as the rinse gas. It is also possible that the rinse gas is some other gas capable of collecting gas bubbles to larger amounts of gas. In this case, the rinse gas can be taken from e.g. a gas bottle connected to the valve system 101 or from another source of the rinse gas. There can be a filter between the source of the rinse gas and the valve system 101 in order to prevent possible impurities from accessing to the flow channels of the disperser device 100.

Figure 2:
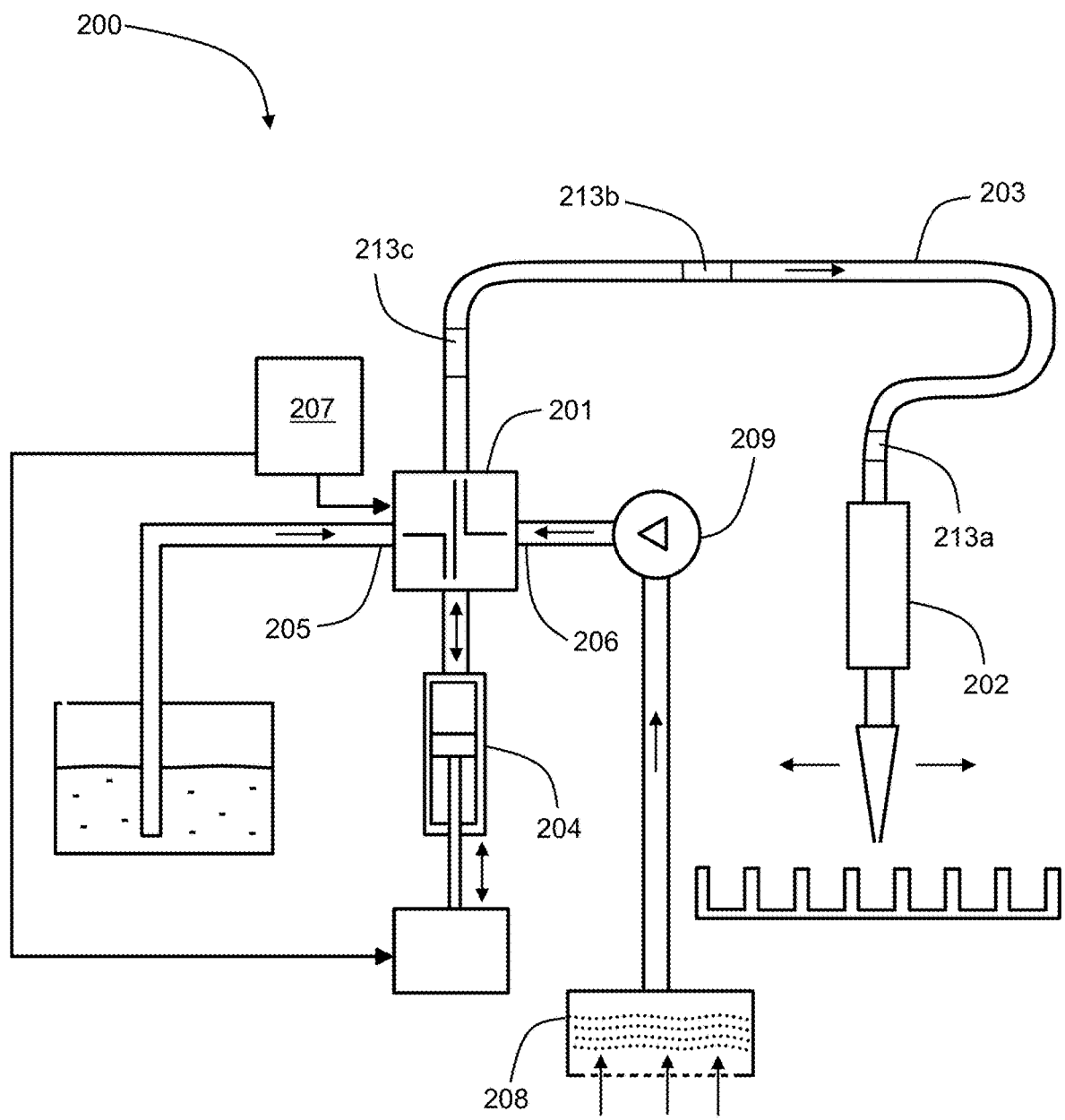
FIG. 2 illustrates a dispenser device according to an exemplifying and non-limiting embodiment.

FIG. 2 illustrates a dispenser device 200 according to an exemplifying and non-limiting embodiment. The dispenser device 200 comprises a valve system 201, a dispensing head 202 connected with a transfer tube 203 to the valve system, and a dispensing pump 204 connected to the valve system. The dispenser device 200 further comprises a first inlet port 205 for conducting rinse liquid to the valve system, a second inlet port 206 for conducting rinse gas to the valve system, and control equipment 207 for operating the valve system so that the flow via the transfer tube 203 towards the dispensing head comprises both the rinse liquid and the rinse gas. The dispenser device 200 comprises equipment 209 for pressurizing the rinse gas at the second inlet port 206. The equipment 209 can be e.g. a blower or a compressor. The dispenser device 200 is configured to use the ambient air as the above-mentioned rinse gas. The dispenser device 200 comprises advantageously a filter 208 for purifying the air used as the rinse gas.

In the exemplifying dispenser device illustrated in FIG. 2, the dispensing pump 204 is used for pumping the rinse liquid to the transfer tube 203 and the equipment 209 is used for pumping the rinse gas to the transfer tube 203. The valve system 201 is configured to conduct the rinse liquid from the dispensing pump 204 to the transfer tube 203 when the valve system is in a first position. The valve system 201 is configured to conduct the rinse liquid from the first inlet port 205 to the dispensing pump 204 when the valve system is in a second position, and the valve system 201 is configured to conduct the rinse gas from the second inlet port 206 to the transfer tube 203 when the valve system is in a third position. The control equipment 207 can be a mechanical lever for controlling the valve system manually, or the control equipment 207 can be an electrical system when the valve system 201 is an electrically controllable valve system. The control equipment 207 is suitable for operating the valve system 201 so that the valve system conducts the rinse liquid from the first inlet port 205 to the dispensing pump 204 when the dispensing pump is in a suction phase and thereafter the valve system conducts the rinse liquid from the dispensing pump 204 to the transfer tube 203 when the dispensing pump is in an exhaustion phase. This operation-sequence for pumping the rinse liquid can be repeated for a desired number of times in order to pump a desired amount of the rinse liquid to the transfer tube 203. The control equipment 207 is suitable for operating the valve system 201 also so that the valve system conducts the rinse gas from the second inlet port 206 to the transfer tube 203. The rinsing operation is advantageously started by pumping the rinse liquid to the transfer tube 203 so that the above-described operation-sequence for pumping the rinse liquid is carried out a desired number of times. Thereafter, a desired amount of the rinse gas is conducted from the inlet port 206 to the transfer tube 203 so as to form a gas column 213a into the transfer tube. Thereafter, the operation-sequence for pumping the rinse liquid is carried out a desired number of times in order to move the gas column 213a in the transfer tube. The above-described operation can be repeated for a desired number of times so as to transfer a desired number of gas columns, such as gas columns 213a, 213b and 213c, through the transfer tube 203.

Figure 3:
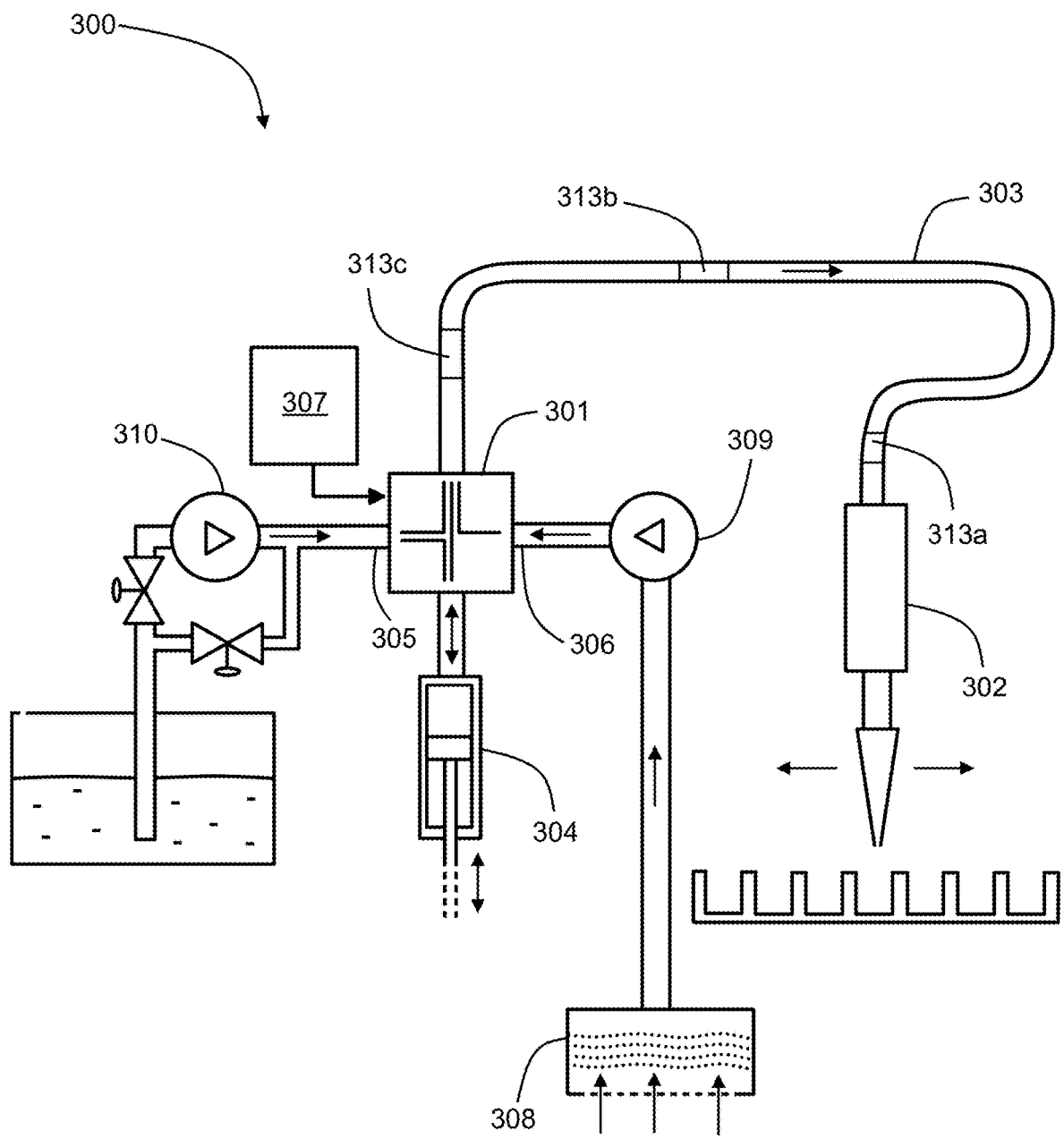
FIG. 3 illustrates a dispenser device according to an exemplifying and non-limiting embodiment.

FIG. 3 illustrates a dispenser device 300 according to an exemplifying and non-limiting embodiment. The dispenser device 300 comprises a valve system 301, a dispensing head 302 connected with a transfer tube 303 to the valve system, and a dispensing pump 304 connected to the valve system. The dispenser device 300 further comprises a first inlet port 305 for conducting rinse liquid to the valve system, a second inlet port 306 for conducting rinse gas to the valve system, and control equipment 307 for operating the valve system so that the flow via the transfer tube towards the dispensing head comprises both the rinse liquid and the rinse gas. The dispenser device 300 comprises first equipment 310 for pressurizing the rinse liquid at the first inlet port 305 and second equipment 309 for pressurizing the rinse gas at the second inlet port 306. The equipment 309 can be e.g. a blower or a compressor and the equipment 310 can be e.g. a centrifugal pump. The dispenser device 300 is configured to use the ambient air as the above-mentioned rinse gas. The dispenser device 300 comprises advantageously a filter 308 for purifying the air used as the rinse gas.

In the exemplifying dispenser device illustrated in FIG. 3, the equipment 310 is used for pumping the rinse liquid to the transfer tube 303 and the equipment 309 is used for pumping the rinse gas to the transfer tube 303. The valve system 301 is configured to conduct the rinse liquid from the first inlet port 305 to the transfer tube 303 when the valve system is in a first position, and the valve system 301 is configured to conduct the rinse gas from the second inlet port 306 to the transfer tube 303 when the valve system is in a second position. During the normal use of the dispenser device 300, the valve system 301 can be in a third position where the valve system forms a flow channel from the dispensing pump 304 to the transfer tube 303. The control equipment 307 can be a mechanical lever for controlling the valve system manually, or the control equipment 307 can be an electrical system when the valve system 301 is an electrically controllable valve system. The rinsing operation is advantageously started by pumping the rinse liquid to the transfer tube 303 so that a desired amount of the rinse liquid is conducted from the first inlet port 305 to the transfer tube 303. Thereafter, a desired amount of the rinse gas is conducted from the second inlet port 306 to the transfer tube 303 so as to form a gas column 313a into the transfer tube. Thereafter, the rinse liquid is conducted from the first inlet port 305 to the transfer tube 303 in order to move the gas column 313a in the transfer tube. The above-described operation can be repeated for a desired number of times so as to transfer a desired number of gas columns, such as gas columns 313a, 313b and 313c, through the transfer tube 303.

Figure 4:
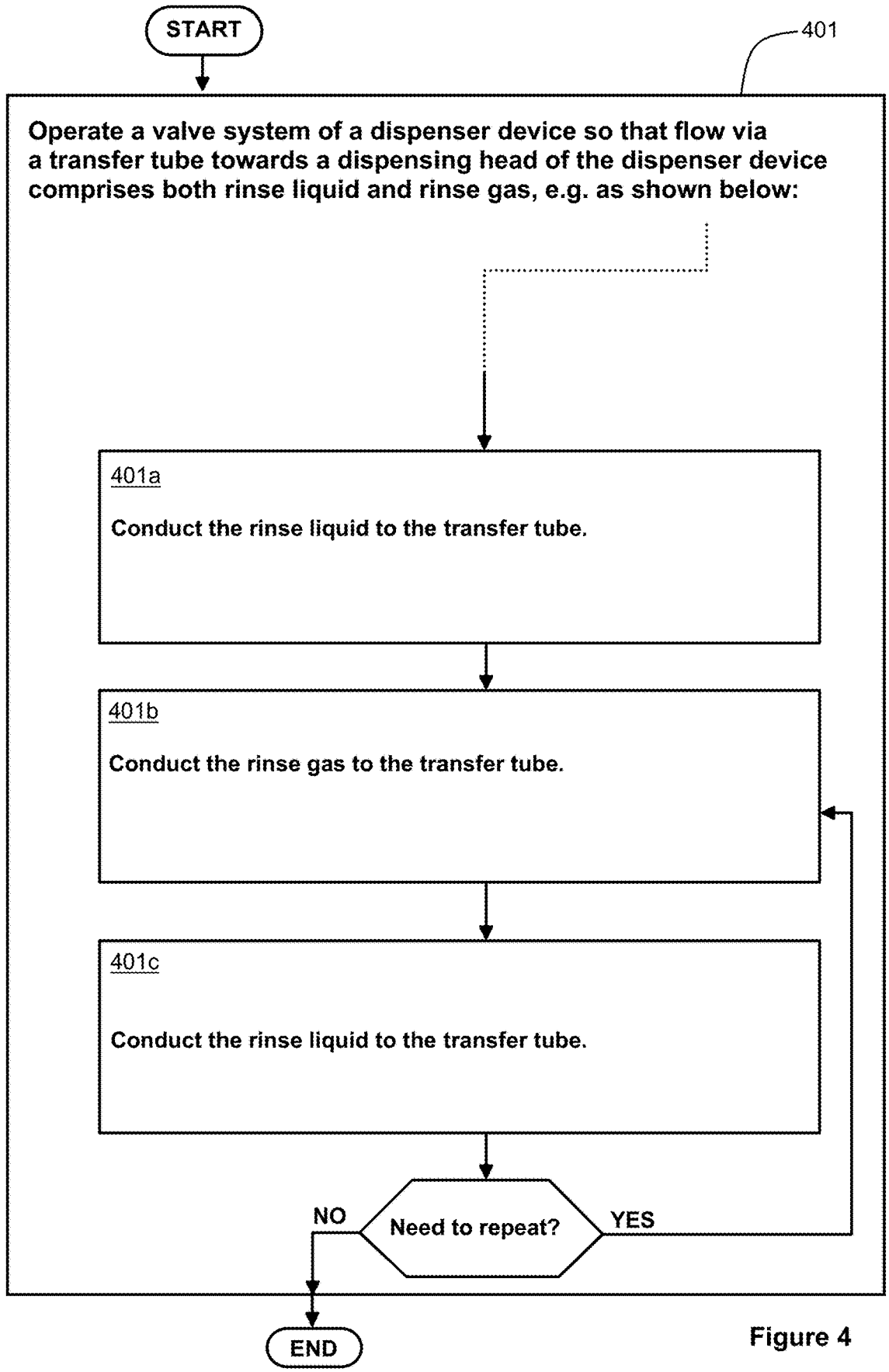
FIG. 4 shows a flowchart of a method according to an exemplifying and non-limiting embodiment for removing gas bubbles from a dispenser device.

FIG. 4 shows a flowchart of a method according to an exemplifying and non-limiting embodiment for removing gas bubbles from a dispenser device that comprises:
    a valve system,
    a dispensing head for dispensing liquid and connected with a transfer tube to the valve system,
    a dispensing pump connected to the valve system,
    a first inlet port for conducting rinse liquid to the valve system, and a second inlet port for conducting rinse gas to the valve system.

The method comprises operating 401 the valve system so that the flow via the transfer tube towards the dispensing head comprises both the rinse liquid received from the first inlet port and the rinse gas received from the second inlet port.

A method according to an exemplifying and non-limiting embodiment comprises operating the valve system so that the rinse liquid and the rinse gas are alternately conducted to the transfer tube as illustrated by the exemplifying method phases 401a, 401b, and 401c shown in FIG. 4.

In a method according to an exemplifying and non-limiting embodiment, the rinse liquid is conducted to the transfer tube by setting the valve system to conduct the rinse liquid from the first inlet port to the dispensing pump and then by setting the valve system to conduct the rinse liquid from the dispensing pump to the transfer tube, and the rinse gas is conducted to the transfer tube by setting the valve system to conduct the rinse gas from the second inlet port to the dispensing pump and then by setting the valve system to conduct the rinse gas from the dispensing pump to the transfer tube.

In a method according to an exemplifying and non-limiting embodiment, the rinse liquid is conducted to the transfer tube by setting the valve system to conduct the rinse liquid from the first inlet port to the dispensing pump and then by setting the valve system to conduct the rinse liquid from the dispensing pump to the transfer tube, and the rinse gas is conducted to the transfer tube by pressurizing the rinse gas at the second inlet port and by setting the valve system to conduct the rinse gas from the second inlet port to the transfer tube.

In a method according to an exemplifying and non-limiting embodiment, the rinse liquid is conducted to the transfer tube by pressurizing the rinse liquid at the first inlet port and by setting the valve system to conduct the rinse liquid from the first inlet port to the transfer tube, and the rinse gas is conducted to the transfer tube by pressurizing the rinse gas at the second inlet port and by setting the valve system to conduct the rinse gas from the second inlet port to the transfer tube.

In a method according to an exemplifying and non-limiting embodiment, the rinse gas is air.

A method according to an exemplifying and non-limiting embodiment comprises filtering the rinse gas conducted to the valve system.

A computer program according to an exemplifying and non-limiting embodiment comprises computer executable instructions for controlling a programmable processing system to operate the valve system according to any of the above-described methods. The computer executable instructions can be generated with a suitable programming language.

A computer program product according to an exemplifying and non-limiting embodiment comprises a non-volatile computer readable medium, e.g. a compact disc "CD", encoded with a computer program according to an embodiment.

A signal according to an exemplifying and non-limiting embodiment is encoded to carry information defining a computer program according to an embodiment.

The specific examples provided in the description given above should not be construed as limiting. Therefore, the protection scope is not limited merely to the exemplifying embodiments described above. Lists and groups of examples presented above are not exhaustive unless otherwise explicitly stated.

What is claimed is:

1. A dispenser device, comprising:
    a valve comprising a first inlet port and a second inlet port, the first inlet port arranged to conduct a rinse liquid to the valve and the second inlet port arranged to conduct a rinse gas to the valve;
    a dispensing head connected with a transfer tube to the valve;
    a dispensing pump connected to the valve; and
    electronic control equipment configured to operate the valve such that flow in the transfer tube towards the dispensing head comprises the rinse liquid and one or more columns of the rinse gas amongst the rinse liquid,
    wherein the one or more columns of the rinse gas collect gas bubbles formed on inner walls of the transfer tube, and
    wherein the valve is configured to:
        conduct the rinse liquid or the rinse gas from the dispensing pump to the transfer tube when the valve is in a first configuration;
        conduct the rinse liquid from the first inlet port to the dispensing pump when the valve is in a second configuration; and
        conduct the rinse gas from the second inlet port to the dispensing pump when the valve is in a third configuration.

2. The dispenser device according to claim 1, wherein the control equipment operates the valve such that the rinse liquid and the rinse gas are alternately conducted to the transfer tube.

3. The dispenser device according to claim 1, further comprising:
    first equipment for pressurizing the rinse liquid at the first inlet port and second equipment for pressurizing the rinse gas at the second inlet port.

4. The dispenser device according to claim 1, wherein the second inlet port is configured to receive ambient air from surroundings of the dispenser device, the ambient air representing the rinse gas.

5. The dispenser device according to claim 1, further comprising:
    a filter for purifying the rinse gas conducted to the valve.

6. The dispenser device according to claim 1, wherein the dispensing pump is a syringe pump.

7. The dispenser device according to claim 1, wherein the valve is a mixer valve.

8. A dispenser device, comprising:
    a valve comprising a first inlet port and a second inlet port, the first inlet port arranged to conduct a rinse liquid to the valve and the second inlet port arranged to conduct a rinse gas to the valve;
    a dispensing head connected with a transfer tube to the valve;
    a dispensing pump connected to the valve; and
    electronic control equipment configured to operate the valve such that flow in the transfer tube towards the dispensing head comprises the rinse liquid and one or more columns of the rinse gas amongst the rinse liquid,
    wherein the one or more columns of the rinse gas collect gas bubbles formed on inner walls of the transfer tube,
    wherein the dispenser device further comprises equipment for pressurizing the rinse gas at the second inlet port, and
    wherein the valve is configured to:

conduct the rinse liquid from the dispensing pump to the transfer tube when the valve is in a first configuration, conduct the rinse liquid from the first inlet port to the dispensing pump when the valve is in a second configuration, and conduct the rinse gas from the second inlet port to the transfer tube when the valve is in a third configuration.

9. The dispenser device according to claim 8, wherein the control equipment operates the valve such that the rinse liquid and the rinse gas are alternately conducted to the transfer tube.

10. The dispenser device according to claim 8, further comprising:

first equipment for pressurizing the rinse liquid at the first inlet.

11. The dispenser device according to claim 8, wherein the second inlet port is configured to receive ambient air from surroundings of the dispenser device, the ambient air representing the rinse gas.

12. The dispenser device according to claim 8, further comprising:

a filter for purifying the rinse gas conducted to the valve.

13. The dispenser device according to claim 8, wherein the dispensing pump is a syringe pump.

14. The dispenser device according to claim 8, wherein the valve is a mixer valve.

15. A method for removing gas bubbles from a dispenser device with a valve that includes a first inlet port and a second inlet port, the first inlet port arranged to conduct a rinse liquid to the valve and the second inlet port arranged to conduct a rinse gas to the valve, a dispensing head connected with a transfer tube to the valve and a dispensing pump connected to the valve, the method comprising:

operating the valve such that flow in the transfer tube towards the dispensing head comprises the rinse liquid received from the first inlet port and, amongst the rinse liquid, one or more columns of the rinse gas received from the second inlet port for collecting gas bubbles formed on inner walls of the transfer tube, wherein the rinse liquid is conducted to the transfer tube by configuring the valve to conduct the rinse liquid from the first inlet port to the dispensing pump and then by configuring the valve to conduct the rinse liquid from the dispensing pump to the transfer tube, and wherein the rinse gas is conducted to the transfer tube by configuring the valve to conduct the rinse gas from the second inlet port to the dispensing pump and then by configuring the valve to conduct the rinse gas from the dispensing pump to the transfer tube.

16. The method according to claim 15, further comprising:

operating the valve such that the rinse liquid and the rinse gas are alternately conducted to the transfer tube.

17. The method according to claim 15, wherein the rinse liquid is conducted to the transfer tube by pressurizing the rinse liquid at the first inlet port and by configuring the valve to conduct the rinse liquid from the first inlet port to the transfer tube, and wherein the rinse gas is conducted to the transfer tube by pressurizing the rinse gas at the second inlet port and by configuring the valve to conduct the rinse gas from the second inlet port to the transfer tube.

18. The method according to claim 15, wherein the rinse gas is air.

19. The method according to claim 15, wherein the method further comprises filtering the rinse gas conducted to the valve.

20. The method according to claim 15, wherein the valve is a mixer valve.

21. A method for removing gas bubbles from a dispenser device with a valve that includes a first inlet port and a second inlet port, the first inlet port arranged to conduct a rinse liquid to the valve and the second inlet port arranged to conduct a rinse gas to the valve, a dispensing head connected with a transfer tube to the valve and a dispensing pump connected to the valve, the method comprising:

operating the valve such that flow in the transfer tube towards the dispensing head comprises the rinse liquid received from the first inlet port and, amongst the rinse liquid, one or more columns of the rinse gas received from the second inlet port for collecting gas bubbles formed on inner walls of the transfer tube, wherein the rinse liquid is conducted to the transfer tube by configuring the valve to conduct the rinse liquid from the first inlet port to the dispensing pump and then by configuring the valve to conduct the rinse liquid from the dispensing pump to the transfer tube, and wherein the rinse gas is conducted to the transfer tube by pressurizing the rinse gas at the second inlet port and by configuring the valve to conduct the rinse gas from the second inlet port to the transfer tube.

22. The method according to claim 21, further comprising:

operating the valve such that the rinse liquid and the rinse gas are alternately conducted to the transfer tube.

23. The method according to claim 21, wherein the rinse liquid is conducted to the transfer tube by pressurizing the rinse liquid at the first inlet port and by configuring the valve to conduct the rinse liquid from the first inlet port to the transfer tube.

24. The method according to claim 21, wherein the rinse gas is air.

25. The method according to claim 21, wherein the method further comprises filtering the rinse gas conducted to the valve.

26. The method according to claim 21, wherein the valve is a mixer valve.

\* \* \* \* \*